No. 796,829. PATENTED AUG. 8, 1905.
C. M. FEIST.
BEARING.
APPLICATION FILED NOV. 9, 1904.

Witnesses:
C. D. Kesler
James L. Norris, Jr.

Inventor
Charles M. Feist
By James L. Norris.
Atty.

UNITED STATES PATENT OFFICE.

CHARLES M. FEIST, OF SIOUX CITY, IOWA.

BEARING.

No. 796,829. Specification of Letters Patent. Patented Aug. 8, 1905.

Original application filed August 24, 1904, Serial No. 222,113. Divided and this application filed November 9, 1904. Serial No. 232,017.

*To all whom it may concern:*

Be it known that I, CHARLES M. FEIST, a citizen of the United States, residing at Sioux City, in the county of Woodbury and State of Iowa, have invented new and useful Improvements in Bearings, of which the following is a specification.

This invention relates to bearings.

The device may be advantageously employed in many connections. I have found it of particular utility in conjunction with trolleys.

That embodiment of the device which I have selected for illustration in the accompanying drawings, forming a part of this specification, includes a frame which may be a trolley-harp, an axle supported by the frame, and a wheel, such as a trolley-wheel, on the axle.

The bearing, as hereinbefore stated, is of particular advantage in conjunction with a trolley, in which use I will hereinafter more particularly describe it in order to set forth its many advantages; but I do not wish to limit the use of the improved device to such field, for it, as I also state, can be incorporated with success in other appliances.

Figure 1:
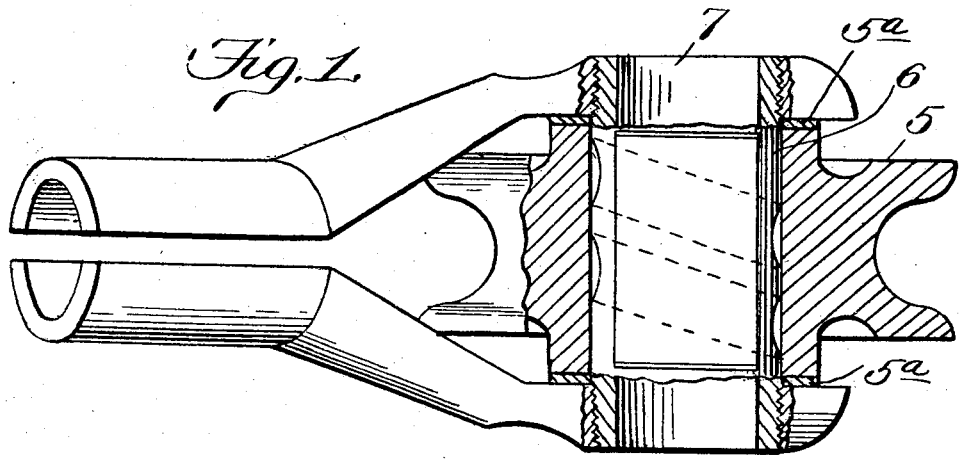
Figure 3:
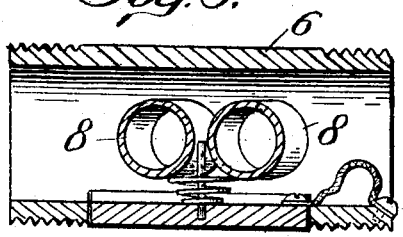
Figure 2:
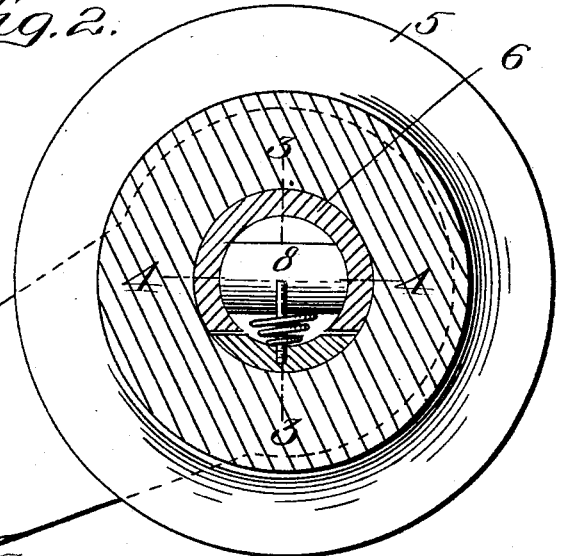
Figure 4:
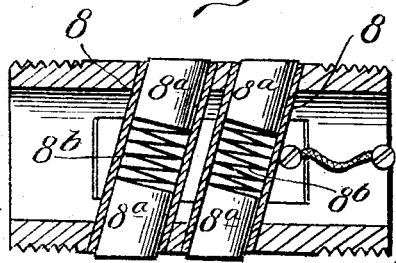

In said drawings, Figure 1 is a bottom plan view of a trolley including my invention, the wheel thereof being represented in section. Fig. 2 is a sectional elevation of the same, the section being taken transversely of the axle. Figs. 3 and 4 are sectional elevations, the sections being on the lines 3 3 and 4 4, respectively, of Fig. 2.

Like characters refer to like parts throughout the views.

The trolley which I have represented in order to show the nature of the invention includes in its construction a wheel, as 5, which may be of the ordinary kind and which is rotatably supported by the axle 6, non-rotatively carried by the bearing or harp 7. The axle 6, like the bearing or harp, may be of any desirable material and is represented as tubular or hollow, its opposite ends being threaded to engage corresponding threads formed in the walls of openings in the halves or complemental sections of the harp 7. From this it will be noticed that the opposite ends of the axle, upon which the trolley-wheel is journaled, are uncovered or unobstructed to permit the passage of air-currents through the axle in order to cool the latter when in use and naturally add to the efficiency of the device as a whole. The wheel 5 turns around the intermediate smooth or unthreaded exterior of the axle or shaft 6.

Extending transversely of the axle 6 is represented a plurality of tubes 8. I have illustrated two of these tubes; but this is not essential. The ends of the tubes are fitted in perforations formed in the body of the axle and are open to communicate with the interior of the wheel. The presence of the tubes provides lubricant-receiving passages, the opposite ends of which are of course open, so that I am enabled to supply with a single passage lubricant at different points. To augment the efficiency of the lubricating portion of the device, I mount the tubes 8 obliquely to the axle, it being evident that when so positioned they distribute from their delivery or outer open ends the lubricant over a greater area than they would if they were disposed at right angles to the axis of the axle. The lubricant contained within the tubes may be of any desirable character. It may consist of graphite, plumbago, or equivalent substance, as $8^a$, in solid form, shaped to agree with the interior shape of the respective tubes and set in the opposite ends thereof and normally pressed outward by means of springs, as $8^b$. The springs, it might be stated, constantly press on the lubricating pieces $8^a$, so as to maintain the same in proper contact with the inner surface of the wheel 5 rotative about the axle 6. When the lubricating substance is initially placed into the tubes, it is made sufficiently long in order to press the springs close together, so that when the parts are assembled the springs can feed the lubricating substance outwardly to the proper extent in order to insure a proper lubrication of the engaging surfaces of the wheel and axle.

This application is a division of that filed by me on August 24, 1904, and numbered in serial 222,113. In said last-mentioned application I claim certain devices which are not embraced by the claims in this application, such as the contact-shoe 9, the manner of mounting the same, and of connecting it with the harp. As these features form no part of the present application, I deem an extended description of the same to be unnecessary.

It will be apparent that by the construction hereinbefore described all engaging parts are thoroughly and uniformly lubricated and that by the provision of the hollow axle with its open opposite ends atmospheric air can enter said axle and circulate through the same in order to cool it and the wheel. I also apply a lubricant to a large number of points within the wheel.

Between the ends of the wheel and the harp surrounding the axle of said wheel I interpose washers, as 5", which prevent cutting between the wheel and the harp. These washers may be made of any suitable material. Fiber or other equivalent frictional substance has been found to be satisfactory for the purpose.

Having thus described my invention, what I claim, and desire to secure by Letters Patent, is—

1. In a bearing, the combination of a wheel, and an axle for supporting the wheel, provided with an obliquely-disposed passage extending entirely through the same, the opposite ends of the passage being open and communicating with the interior of the wheel.

2. In a bearing the combination of a wheel, a suitably-mounted axle for supporting the wheel, and a plurality of obliquely-disposed tubes extending entirely transversely through the axle, open at their opposite ends.

3. In a bearing, an axle and a tube extending obliquely through the axle and open at its opposite ends.

4. In a bearing, the combination of a wheel, a suitably-mounted axle for supporting the wheel, a plurality of obliquely-disposed tubes extending entirely through the axle and open at their opposite ends, pieces of lubricating material set in said opposite open ends, and springs in the tubes bearing against the lubricating material to normally feed the same outwardly.

In testimony whereof I have hereunto set my hand in presence of two subscribing witnesses.

CHARLES M. FEIST.

Witnesses:
R. H. BURTON SMITH,
C. A. BENTON.